United States Patent
Ong et al.

(10) Patent No.: US 8,711,093 B2
(45) Date of Patent: Apr. 29, 2014

(54) INPUT DEVICE WITH PHOTODETECTOR PAIRS

(75) Inventors: Chi-Boon Ong, Singapore (SG); Yu-Feng Yao, Singapore (SG); Sze-Ping Ong, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 387 days.

(21) Appl. No.: 12/822,352

(22) Filed: Jun. 24, 2010

(65) Prior Publication Data

US 2011/0316776 A1    Dec. 29, 2011

(51) Int. Cl.
*G06F 3/033* (2013.01)

(52) U.S. Cl.
USPC ........... 345/158; 345/163; 345/165; 345/166; 345/167; 345/175

(58) Field of Classification Search
None
See application file for complete search history.

(56) References Cited

U.S. PATENT DOCUMENTS

| | | | |
|---|---|---|---|
| 6,300,940 B1 * | 10/2001 | Ebina et al. | 345/161 |
| 7,239,304 B2 | 7/2007 | Hoshino et al. | |
| 7,405,389 B2 * | 7/2008 | Dueweke et al. | 250/221 |
| 7,589,709 B2 * | 9/2009 | Liess et al. | 345/157 |
| 7,719,524 B2 * | 5/2010 | Hoshino et al. | 345/175 |
| 2004/0017355 A1 * | 1/2004 | Shim | 345/157 |
| 2007/0046629 A1 * | 3/2007 | Chi-Boon et al. | 345/158 |
| 2007/0247433 A1 * | 10/2007 | Li | 345/169 |
| 2009/0058687 A1 | 3/2009 | Rothkopf et al. | |
| 2009/0101804 A1 * | 4/2009 | Phan Le | 250/221 |
| 2010/0019993 A1 * | 1/2010 | Chui | 345/31 |
| 2010/0188354 A1 * | 7/2010 | Tamura | 345/173 |
| 2010/0245289 A1 * | 9/2010 | Svajda | 345/175 |
| 2011/0057906 A1 * | 3/2011 | Raynor et al. | 345/175 |
| 2011/0174959 A1 * | 7/2011 | Geloven et al. | 250/208.6 |

FOREIGN PATENT DOCUMENTS

| | | |
|---|---|---|
| JP | 8179878 | 7/1996 |
| JP | 08179878 A * | 7/1996 |
| KR | 20050120505 | 12/2005 |

* cited by examiner

*Primary Examiner* — Dismery Mercedes

(57) ABSTRACT

Input devices configured to provide user interface by detecting three dimensional movement of an external object are disclosed. The input device comprises at least two photodetector pairs, a radiation source and a circuit configurable to detect differential and common mode signals generated in the photodetector pairs. By detecting the common mode and differential signals, movement of an external object may be determined and used to control a pointer, or a cursor.

20 Claims, 6 Drawing Sheets

INPUT DEVICE WITH PHOTODETECTOR PAIRS

BACKGROUND

As most electronic devices and electrical appliances are designed with liquid crystal display (hereinafter LCD) screens, input devices capable of controlling a pointer on the screen have become popular. Input devices specifically designed to control a pointer are also known as navigation input devices. In the past, navigation input devices were commonly used in computing systems such as desktop computers. Today, many electronic devices and electrical appliances have an LCD screen that utilizes a navigation input device.

Utilizing a navigation input device, a user may navigate a pointer on a screen over a graphical user interface. Examples of navigation input devices typically used today include a mouse, a touch screen, and a touch pad. Most navigation input devices are operable to control a pointer in a two dimensional plane, although the graphical user inter-face may be three dimensional (referred hereinafter as 3D) in a virtual space. Navigation input devices capable of controlling a pointer in a virtual 3D space are known as a three dimensional navigation devices.

Some navigation input devices with small form factors may be operated using a finger, such as a touch screen or touch pad. These navigation input devices are becoming popular in portable devices, such as mobile phones, portable game consoles, portable electronic readers, and similar devices.

BRIEF DESCRIPTION OF THE DRAWINGS

Illustrative embodiments by way of examples, not by way of limitation, are illustrated in the drawings. Throughout the description and drawings, similar reference numbers may be used to identify similar elements.

DETAILED DESCRIPTION

Figure 1:
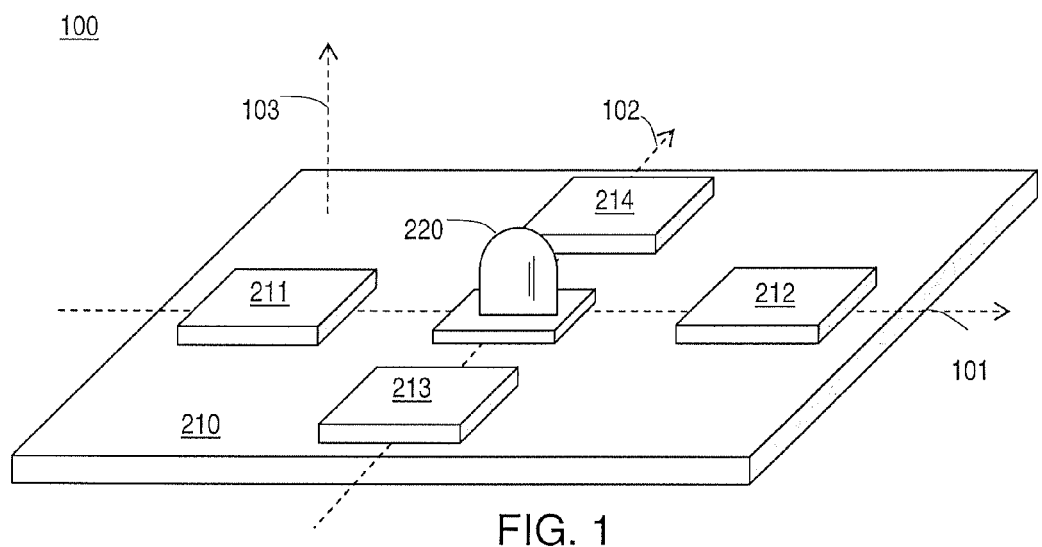
FIG. 1 illustrates an isometric view of an input device.

FIG. 1 illustrates an embodiment showing isometric view of an input device 100 which may comprise photodetector pairs 211-214, a radiation source 220 and a substrate 210. The radiation source 220 and the photodetector pairs 211-214 may be attached to the substrate 210 such that the radiation source 220 and a first photodetector pair 211-212 may be positioned along a first axis 101. The radiation source 220 and a second photodetector pair 213-214 may be positioned along a second axis 102 perpendicular to the first axis 101. The first and second axes 101-102 may be positioned planarly parallel to the substrate 210. The input device 100 may be configured to detect movement of an external object along the first axis 101, the second axis 102 or an axis 103 perpendicular to the first and second axes.

The radiation source 220 may be a light source emitting visible light, or a radiation source emitting radiation invisible to human eye such as infrared or ultraviolet (UV) radiation. The choice of utilizing a visible or an invisible light source depends on the design requirements. A visible light source, such as any color light emitting diode (referred to hereinafter as LED) may be appealing in terms of look but some users may prefer to work on a device without visible light. In such situations, an LED emitting UV or infrared radiation may be employed. For consumer products, infrared radiation sources may be commonly used.

The photodetector pairs 211-214 may be photodiodes, phototransistors or photodiodes with integrated amplifiers. For example, using a conventional CMOS process, the photodetectors 211-214 may be photodiodes implemented using a N-type well and P-type substrate. Depending on the process, the photodiode may have a peak spectral response at a wavelength between 450 nm-950 nm. Correspondingly, the radiation source 220 may be configured to emit radiation with a wavelength between 450 nm-950 nm to obtain optimal performance.

Figure 2A:
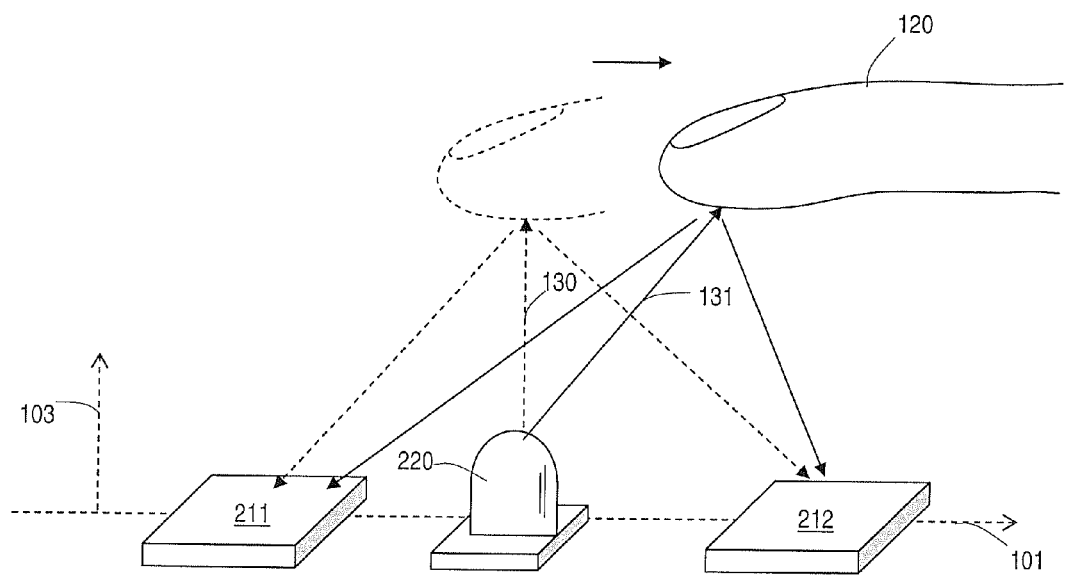
FIGS. 2A-2B illustrate how the input device detects movement along a first axis and an axis perpendicular to the substrate.
Figure 2B:
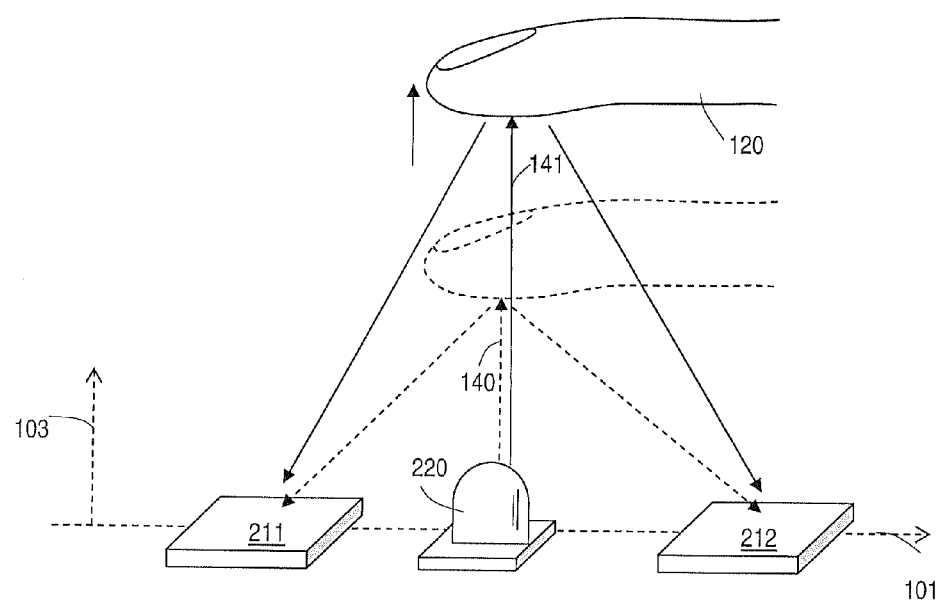

FIGS. 2A-2B illustrate how the input device 100 may be operable to detect movement of an external object 120, such as a finger, a reflector held by a hand, or something similar. For simplicity of illustration, only the first photodetector pair 211-212 and the radiation source 220 are illustrated. With reference to FIG. 2A, the radiation source 220 may be positioned between the first photodetector pair 211-212. When the external object 120 is not positioned within the range of a predetermined distance, radiation emitted by the radiation source 220 may not be reflected at all. Even if the radiation is being reflected, the radiation may be substantially low, or may not fall on the photodetectors 211-212. The predetermined distance may be in a range of a few centimeters or tens of centimeters from the photodetectors 211-212 when measured along the axis 103.

With reference to FIG. 2A, when an external object 120 is within the range of the predetermined distance, the radiation emitted by the radiation source 220 may be reflected and received by both the photodetectors 211-212. Movement of the external object 120 along the first axis 101 may be configured to cause a larger signal to be generated in one photodetector of the first photodetector pair 211-212 and less signal to be generated in the other photodetector of the first photodetector pair 211-212.

For example, when the external object 120 is positioned above the photodiode, radiation from the radiation source 220, such as ray 130, may be reflected equally to the photodetectors 211-212 such that signals generated at both photodetectors 211-212 may be substantially equal. However, when the external object 120 moves along the first axis 101 towards photodetector 212, radiation from the radiation source 220, as shown by ray 131, may be reflected more towards photodetector 212. As a result, a larger signal may be generated in the photodetector 212 than the photodetector 211. This may create a differential signal between the photodetector pair 211-212, which correlates to movement along the first axis 101 in the direction of photodetector 212 and away from photodetector 211.

Similarly, movement of the external object 120 along the second axis 102 (shown in FIG. 1) may be determined using the second photodetector pairs 213-214 (shown in FIG. 1) following the same method. Consequently, by monitoring the differential signal values generated by the both photodetector pairs 211-2 and 213-214, the position of the external object 120 along the plane planarly parallel to the substrate 210 may be determined.

With reference to FIG. 2B, when the external object 120 moves along the axis 103 perpendicular to the first and second axes 101-102, radiation emitted by the radiation source 220 which is reflected to both the photodetectors 211-212 may be reduced equally. Correspondingly, when the external object 120 moves further away beyond the predetermined distance, then the reflected radiation becomes undetectable.

In the embodiment shown in FIG. 2B, when the external object 120 is positioned above and substantially in the middle of the photodetectors 211-212, radiation emitted by the radiation source 220, as shown by ray 140, may be reflected substantially proportionately to both photodetectors 211-212. Even when the external object 120 moves further away along the axis 103, radiation emitted by the radiation source 220, as shown by ray 141, may still be reflected proportionately to both photodetectors 211-212. However, when the external object 120 moves further away, the radiation received by the photodetectors 211-212 may be reduced proportionately in each of the photodetectors 211-212. The same phenomenon may also be observed at the second photodetector pair 213-214.

As explained above, the movement of the external object 120 substantially along the axis 103 perpendicular to the first and second axes 101-102 may be determined by proportionate signals being generated in all the photodetectors 211-214. Movement of the external object 120 along the axis 103 may also be determined by detecting common mode of the signals generated in the first and second photodetector pairs 211-214. Common mode signals may be signals when a differential pair signals move in same direction and will be explained in next paragraphs.

Figure 3:
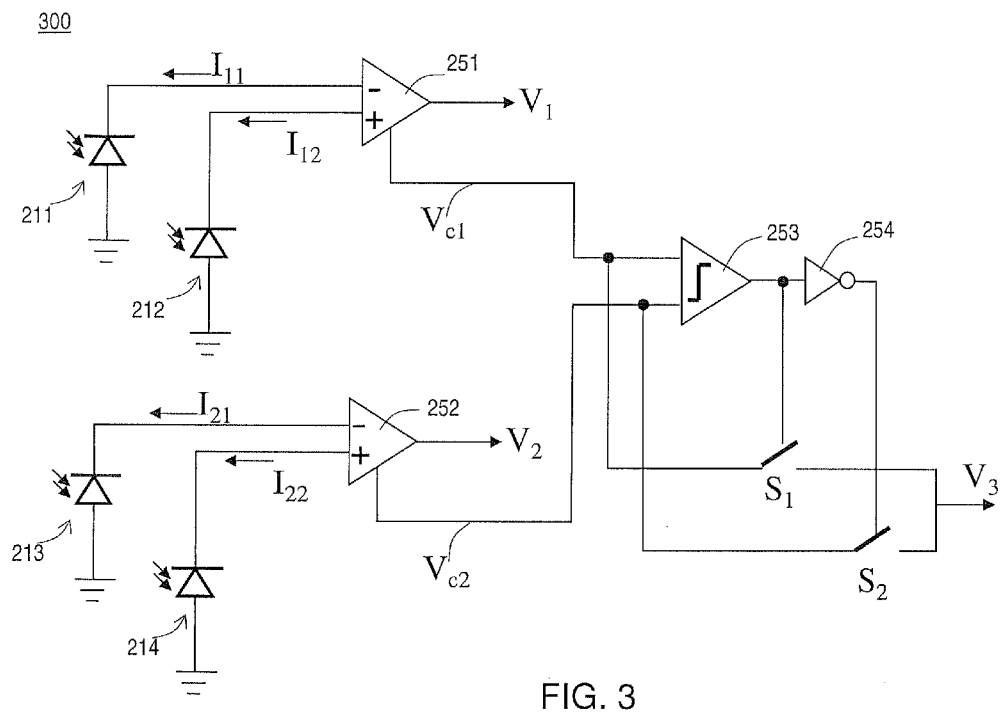
FIG. 3 illustrates an embodiment of a circuit electrically coupled to the first and second photodetector pairs.

FIG. 3 illustrates an embodiment of a circuit 300 electrically coupled to the first and second photodetector pairs 211-214. The circuit 300 may comprise differential amplifiers 251-252. The differential amplifier 251 may be electrically coupled to the first photodetector pair 211-212. For example, when a radiation is being reflected onto the first photodetector pair 211-212, photocurrents $I_{11}$ and $I_{12}$ may be generated in the photodetectors 211-212, respectively. Similarly, the second photodetector pair 213-214 may be operable to generate photocurrents $I_{21}$ and $I_{22}$, respectively when radiation is reflected onto the second photodetector pair 213-214.

The output from the photodetectors 211-214 may be electrically coupled to the differential amplifiers 251-252. In other words, the output from the photodetectors 211-214 may be directly connected to the differential amplifiers 251-252 or may be connected to the differential amplifiers 251-252 indirectly through current buffers, capacitors or some other electrical components (not shown). The differential amplifiers 251-252 may be conventional fully differential amplifiers with feedback. The detailed construction of the differential amplifiers 251-252 may be done by a person with ordinary skills in the art.

The differential amplifiers 251-252 may be configured to produce voltage outputs $V_1$ and $V_2$, respectively. The voltage output $V_1$ may be proportional to the differential value of photocurrents $I_{11}$ and $I_{12}$, and the voltage output $V_2$ may be proportional to the differential value of photocurrents $I_{21}$ and $I_{22}$, respectively.

For example, referring to FIG. 2A and FIG. 3, when more radiation is being reflected onto the photodetector 212 compared to photodetector 211, as illustrated in FIG. 2B, $I_{12}$ may increase and $I_{11}$ may decrease. As a result, the differential signal generated by $I_{11}$ and $I_{12}$ may increase, and this may yield a larger voltage output of $V_1$. When an equal amount of the radiation is being reflected onto the photodetectors 211-212, the photo current generated $I_{21}$ and $I_{22}$ may have a substantially similar value, thus resulting in a smaller differential value, and thus, yield a small voltage output of $V_1$ from differential amplifier 251. When the external object 120 moves in the opposite direction towards photodetector 211, the voltage output of $V_1$ may decrease further or may become a negative value.

In short, the voltage output of $V_1$ may be configured to indicate movement along the first axis 101 (as shown in FIG. 1). In a similar way, the voltage output of $V_2$ may be configured to indicate movement along the second axis 102 (as shown in FIG. 1) using the second photodetector pair 213-214 and the differential amplifier 252.

Usually, a differential amplifier, which is configured to produce a differential output signal, can also be configured to produce an output proportional to the common mode signal with little modification. In the embodiment shown in FIG. 3, the common mode of the photocurrents $I_{11}$ and $I_{12}$, and photocurrents $I_{21}$ and $I_{22}$ may be detected using the differential amplifiers 251-252 and amplified as $V_{c1}$ and $V_{c2}$, respectively.

For example, referring to FIG. 2B and FIG. 3, when the external object 120 moves along the axis 103 further away from the radiation source 220, the absolute value of $I_{11}$ and $I_{12}$ may decrease simultaneously, and thus, cause the common mode signal $V_{c1}$ to decrease accordingly. However, note that the voltage output $V_1$ may remain unchanged because the photodetector pair 211-212 may be receiving the same amount of radiation.

In the opposite scenario, when the external object 120 in FIG. 2A moves toward the radiation source 220, both $I_{11}$ and $I_{12}$ increase simultaneously, causing the common mode signal $V_{c1}$ to increase accordingly. The common mode signal $V_{c2}$ generated using the second photodetector pair 213-214 may behave in a similar manner. Movement along the axis 103 perpendicular to the first and second axes 101-102 may be determined by using the common mode signal $V_{c1}$ of the first photodetector pair 211-212, or by using the common mode signal $V_{c2}$ of the second photodetector pair 213-214, or by using both common mode signals $V_{c1}$ and $V_{c2}$. For example, in the circuit 300 shown in FIG. 3, a "select the stronger" method may be used.

Referring to FIG. 3, the common mode signals $V_{c1}$ and $V_{c2}$ may be connected to a comparator 253. In the embodiment shown in FIG. 3, the comparator 253 may be indirectly connected to the output of photodetector pairs 211-214. The output of the photodetector pairs 211-214 may be first connected to the differential amplifiers 251-252, in which the output may be then connected to the comparator 253.

For example, when the common mode signal generated in the first photodetector pair 211-212 $V_{c1}$ becomes higher than the common mode signal generated in the second photodetector pair $V_{c2}$, the output of the comparator 253 may become logic Low, and thus turns off switch S1. The output of the comparator 253 may be connected to an inverter 254 which turns on the switch S2. As a result, the common mode signal $V_{c1}$ may be selected as the voltage output $V_3$ indicating the movement along the axis 103.

On the other hand, when the common mode signal $V_{c1}$ becomes lower than the common mode signal $V_{c2}$, the output of the comparator 253 may turn logic High, and thus turns on switch S1. The inverter 254 may be operable to turn off the switch S2. Thus, the common mode signal $V_{c2}$ may be selected as the voltage output $V_3$. Other methods may be used, such as multiplying the common mode signals $V_{c1}$ and $V_{c2}$ with a weighting factor, or alternatively, taking average values can also be used with additional logic or digital processing circuits. In some situations, further digital signal processing may be performed. In such circumstances, an analog to digital converter may be connected to the voltage outputs $V_1$, $V_2$, $V_{c1}$ and $V_{c2}$ to convert the analog values into digital values for digital signal processing.

The input device 100 may be used in three dimensional navigation applications. Most of the 3D games today are played using conventional mice, which are two dimensional navigation devices. Although a two dimensional navigation device may be used for 3D game applications, having a three dimensional navigation device may add realness or vivid feel to the games. This can be understood because a two dimensional navigation device may not be able to produce an input for a virtual 3D space. For example, consider playing a 3-D ping pong game using a conventional mouse to hold a ping pong "bat". The two dimensional device can only allow the user to move the "bat" by pointing at the two dimension screen. However, using a 3-D navigation device permits the user to control the "bat" moving forward, backward, up, clown, left or right, reflecting precisely what happens in reality.

For conventional two dimension navigation applications, the movement along the axis 103 may be used for additional functions, such as replacing "right click" or "left click" found in existing navigation applications. In addition to navigation applications, the input device 100 may be used as a directional input device, such as a joystick, or replacing a job dial wheel found in some mobile phone devices, or replacing multiple input keys found in some key pads.

Figure 4:
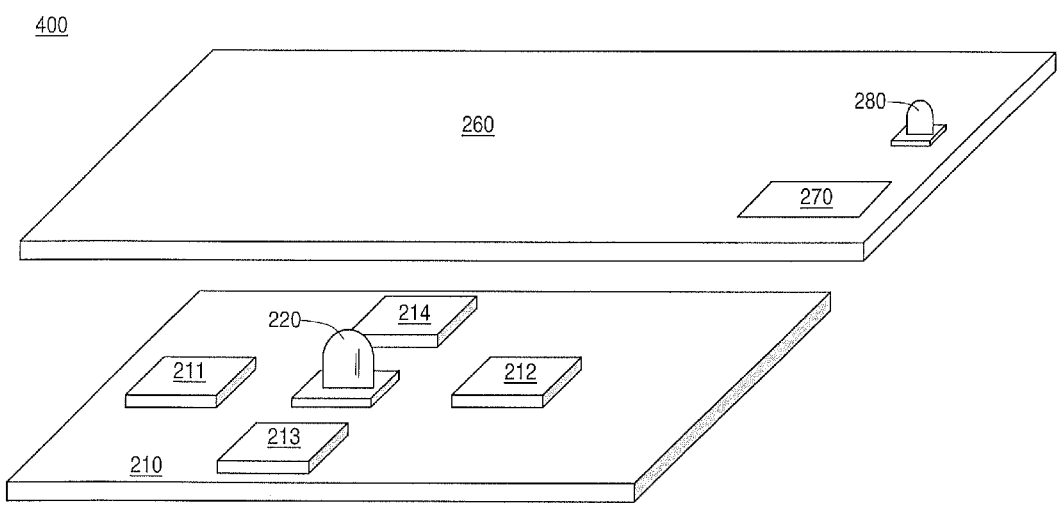
FIG. 4 illustrates an input device with a top plate, indicator LED and a sensor.

The input device 100 shown in FIG. 1 may be supplemented with additional elements such as additional sensors and indicator light sources to provide more functionality. For example, FIG. 4 illustrates an alternate embodiment showing isometric view of an input device 400 which may comprise photodetector pairs 211-214, a radiation source 220, a substrate 210, a top plate 260, a sensor 270, and an indicator light source 280.

The top plate 260 may be positioned planarly parallel and above the substrate 210. The top plate 260 may be made from plastic, glass, poly urethane, or other similar materials. The top plate 260 may be configured to prevent dust from gathering at the radiation source 220 or the photodetectors 211-214. The top plate 260 may or may not be transparent to the human eye but may be made transparent to the radiation emitted by the radiation source 220.

The sensor 270 may be configured to produce an output when the external object touches the top plate 260. For example, in FIG. 4, the sensor 270 may be a vibration sensor or a capacitive sensor configured to produce an output when an external object such as a finger taps on the top plate 260. The sensor 270 may be positioned on the substrate 210, or on the top plate 260.

The sensor 270 may be configured to be used as additional input terminals. For example, when the navigation device 400 is used as a three dimensional navigation device controlling the position of a virtual pointer in a 3D game, a tap on the top plate 260 may be configured to be an input to reset the position of the virtual pointer to a default position. Additional sensors similar to the sensor 270 may be added to the input device 400.

In order to make the input device 400 more user friendly, additional user interface such as indicator light source 280 may be added. For example, the indicator light source 280 may be configured to be turned on when an external object is detected. This feature may be useful if the radiation emitted by the radiation source 220 is not visible to the human eye. For designs with visible radiation source 220, a similar user interface may be achieved by powering up more radiation when an external object is detected.

Figure 5:
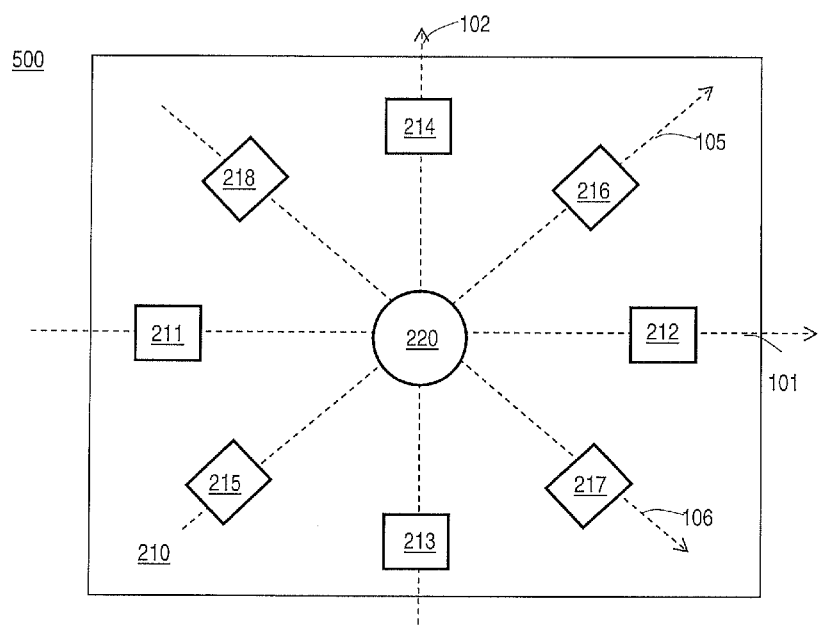
FIG. 5 illustrates a top view of an input device with four pairs of photodetectors.

The input devices shown in FIG. 1 and FIG. 4 have two pairs of photodetectors 211-214. However, more photodetectors pairs may be added. For example, FIG. 5 illustrates a top view of an input device 500 with four pairs of photodetectors. The input device 500 comprises a substrate 210, a radiation source 220, first and second photodetector pairs 211-214 as found in the input device 100. The input device 500 also comprises a third photodetector pair 215-216 and a fourth photodetector pair 217-218.

The third photodetector pair 215-216 may be positioned along a third axis 105 whereas the fourth photodetector pair 217-218 may be positioned along a fourth axis 106. Similar to the arrangement in the first and second photodetector pairs 211-214, the radiation source 220 may be positioned in the middle of the respective third and fourth photodetector pairs 215-218. The first and second axes 101-102, as well as the third and fourth axes 105-106 may be positioned in a plane planarly parallel to the substrate 210. The third axis 105 may be substantially perpendicular to the fourth axis 106. The third axis 105 and the first axis 101 may be at a predetermined angle, for example, 45 degrees. Similarly, the fourth axis 106 and the second axis 102 may be at a predetermined angle, such as 45 degrees.

The third and fourth photodetector pairs 215-216 may be operable to detect movements of an external object along the third and fourth axes in a similar manner to the discussion of the first and second photodetector pairs 211-214 in FIG. 2A. Similarly, the third and fourth photodetector pairs 215-216 may be operable to detect movement of an external object along an axis 103 perpendicular to the substrate 210 in a similar manner shown in FIG. 2B. The third and fourth photodetector pairs 215-216 may be connected to a circuit as discussed earlier with respect to FIG. 3.

Movements along the third and fourth axes 105-106 may be converted to the first and second axes 101-102 using multiplying factors. For example, if the third axis forms a degree of 45 degree with the first and second axes, the detected readings can be converted to the first and second axes by multiplying the reading with cosine 45 and sine 45 respectively. The detection from the third and fourth photodetector pairs 215-218 may be used to supplement the detection of the first and second photodetector pairs 211-214 in order to achieve further precision.

Figure 6:
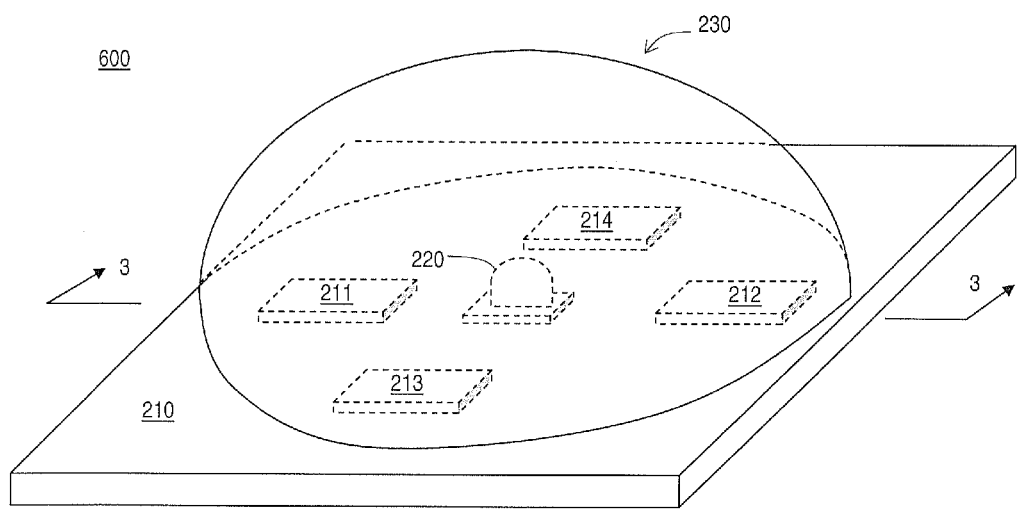
FIG. 6 illustrates an isometric view of an input device with reflector dome.

The input device 100 shown in FIG. 1 may be made more energy efficient and reliable by utilizing a reflector dome rather than relying on the reflection by an external object 120. Usually, a reflector can reflect more radiation than an external object 120 which may not be reflective. FIG. 6 illustrates an embodiment showing isometric view of an input device 600 with a reflector dome 230. The input device 600 may comprise a substrate 210, first and second photodetector pairs 211-214, a radiation source 220, and a reflector dome 230.

The reflector dome 230 may be positioned above the radiation source 220 such that radiation emitted from the radiation source 220 may be reflected substantially proportionately to all the photodetectors 211-214. The reflector dome 230 may be made from an elastic, reflective material. For example, the reflector dome 230 may be a thin metal dome or a rubber type material with interior surface coated with reflective material. It should be noted that although FIG. 6 illustrates two photodetector pairs 211-214, this is equally applicable to four photodetector pairs as shown in FIG. 5 or more photodetector pairs.

Figure 7A:
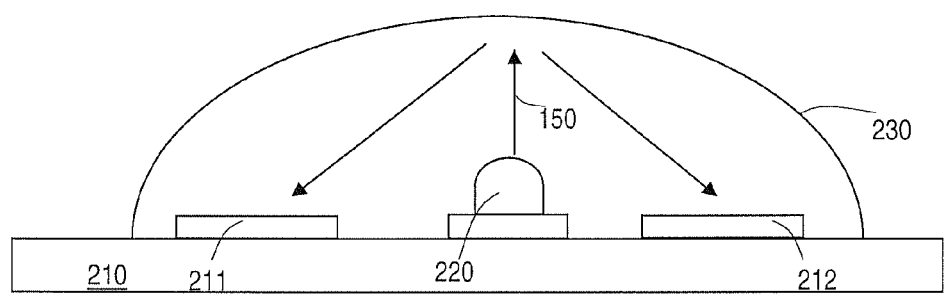
FIGS. 7A-7C illustrate how an input device with reflector dome detects movement.
Figure 7B:
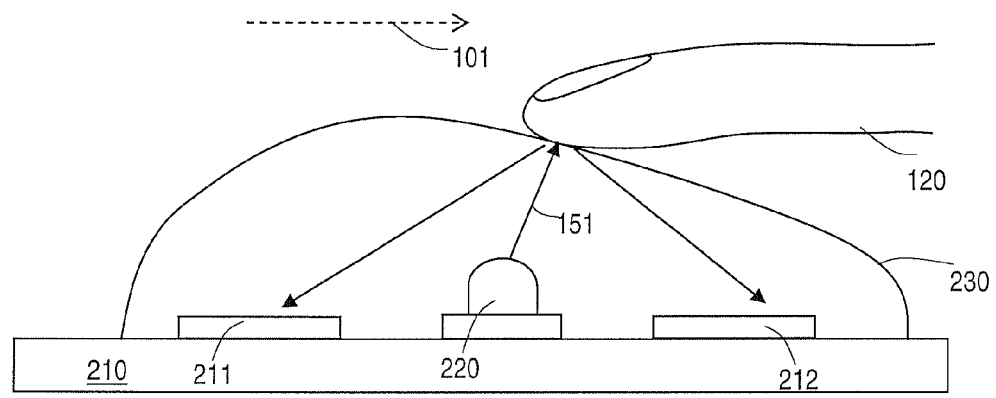
Figure 7C:
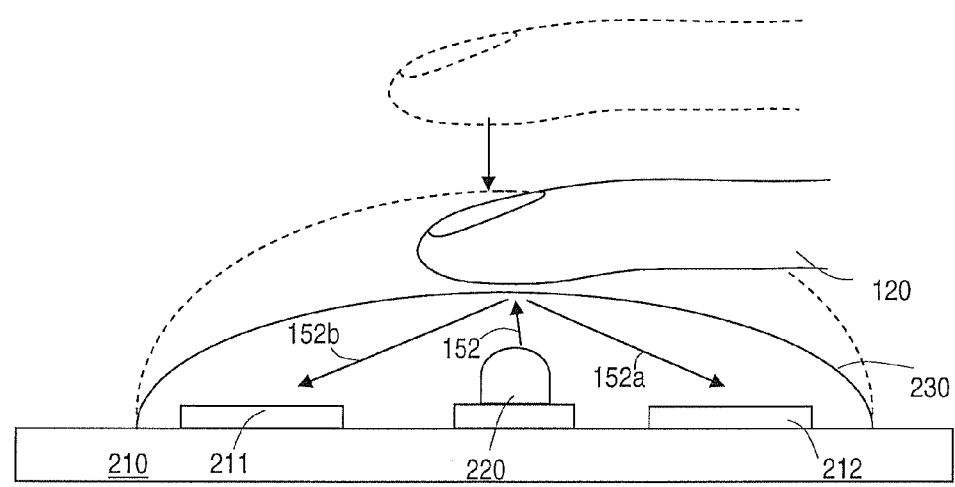

FIGS. 7A-7C illustrate how the input device 600 detects movement using a cross-sectional view of the input device 600 along line 3-3 shown in FIG. 6. As shown in FIG. 7A, without the presence of any external object 120, radiation from the radiation source 220, as shown by ray 150, may be reflected substantially proportionately to the photodetector pair 211-212.

Without the presence or compression from external object 120, the input device 600 may be in an idle mode. However, when an external object 120 first compresses the reflector dome 230 to a default position as shown in FIG. 7C, the input device 600 may be configured to be in an operation mode and starts to detect movements.

FIG. 7B illustrates how movement along the first axis 101 may be detected. When an external object 120, such as a human finger, compresses the reflector dome 230 in a certain direction as shown in FIG. 7B, the reflector dome 230 may be deformed such that more radiation, as shown by ray 151, may be directed more toward one photodetector 212 compared to another photodetector 211 of the first photodetector pair 211-212. The mechanism of how the input device 600 works may be similar to the input device 100 discussed in FIG. 2B except that more radiation may be reflected, as the flexible, reflective dome may reflect more light than an external object 120, such as a finger. The reflective dome may be made from a flexible metallic material, or any resilient material that is either reflective or at least partially coated by a metallic or reflective material.

When the reflector dome 230 is being compressed evenly by the external object 120 as shown in FIG. 7C, the photodetector pair 211-212 may receive substantially similar amount of reflection but as the reflector dome 230 is being moved closer to the photodetectors 211-212, the common mode signal generated by the photodetectors 211-212 may increase. Similar to discussion in FIG. 2B and FIG. 3, movement of the external object 120 in the axis perpendicular to the substrate may be detected in this situation.

Figure 8:
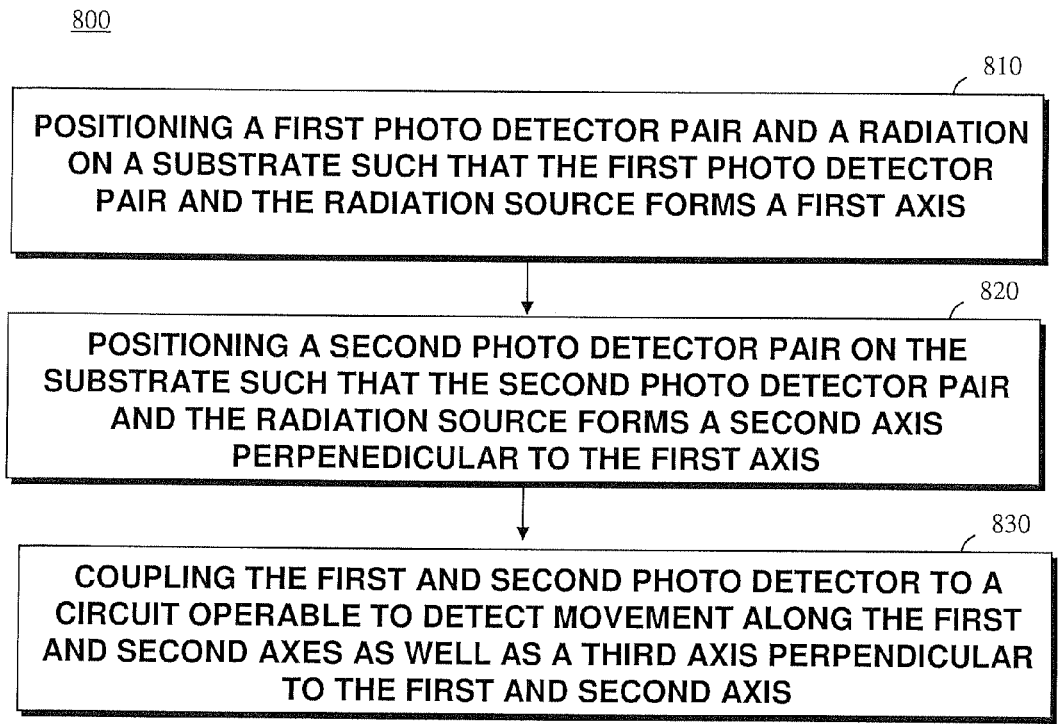
FIG. 8 shows a flow chart illustrating a method for making input device.

FIG. 8 shows a flow chart 700 illustrating a method for making the input device 100 shown in FIG. 2. In step 810, a first photodetector pair and a radiation source may be positioned on a substrate along a first axis. The radiation source may be positioned in the center of the first photodetector pair such that movement of an external object along the first axis operable to cause more photo signal generated in one photodetector of the first photodetector pair and less photo signal to be generated in the other photodetector of the first photodetector pair.

The method 800 then proceeds to step 820, in which a second photodetector pair and the radiation source may be positioned on the substrate along a second axis perpendicular to the first axis. The first and second axes may be planarly parallel to the substrate. The radiation source may be positioned in the center of the second photodetector pair. Similar to step 810, movement of the external object along the second axis may be operable to cause more photo signal generated in one photodetector of the second photodetector pair and less photo signal to be generated in the other photodetector of the second photodetector pair.

The method 800 then proceeds to step 830, in which the first and second photodetector pairs may be electrically coupled to a circuit. The circuit may be configured to detect movement of the external object such that movement of the external object along the first and second axes are detected through differential photo signals generated in the first and second photodetector pairs respectively. Movement along an axis perpendicular to the first and second axes detected through the common mode photo signals generated in the first and second photodetector pairs. For additional features, for example top plate as shown in FIG. 4, additional steps of positioning a top plate planarly parallel to the substrate above the radiation source, the first and second photodetector pairs may be needed. Similarly, if a flexible, reflective dome is utilized, additional processing steps may be necessary.

Although specific embodiments of the invention have been described and illustrated herein above, the invention is not to be limited to the specific forms or arrangements of parts so described and illustrated. For example, radiation source described above may be LEDs as disclosed in the embodiments herein, but can also be a laser, or some other future light source. The scope of the invention is to be defined by the claims appended hereto and their equivalents.

What is claimed is:

1. An input device, comprising:
a radiation source;
a first photodetector pair located along a first axis with the radiation source located between the first photodetector pair; the first photodetector pair being configured to generate a first common mode signal;
a second photodetector pair located along a second axis perpendicular to the first axis, the second photodetector pair being configured to generate a second common mode signal; and
a circuit coupled with the first and second photodetector pairs and configured to detect movement along another axis perpendicular to the first and second axes by measuring an average value of the first and second common mode signals, the circuit having one or more circuit outputs of three dimensional signal values indicative of a three dimensional movement of an external object.

2. The input device of claim 1 further comprising:
a third photodetector pair positioned along a third axis with the radiation source located between the third photodetector pair; and
a fourth photodetector pair positioned along a fourth axis with the radiation source located between the fourth photodetector pair;
wherein the third and fourth axes are on a same plane as the first and second axes, and wherein the circuit is configured to detect movement of the external object along another axis perpendicular to the third and fourth axes through photo signals generated in the third and fourth photodetector pairs;
wherein the circuit is configured to detect movement of the external object along the first axis by measuring the photo signals from the third photodetector pair.

3. The input device of claim 1, further comprising a capacitive sensor and a top plate, wherein:
the top plate is disposed above the first and second photodetector pairs;
the capacitive sensor is disposed at the top plate and the capacitive sensor is configured to produce an output when the external object touches the top plate.

4. The input device of claim 3, wherein the input device further comprises an indicating light source disposed at the top plate and the indicating light source is configured to emit light providing indication when the external object is detected by the circuit.

5. The input device of claim 1, wherein the input device forms a portion of a three dimensional navigation device.

6. The input device of claim 1, wherein:
the circuit comprises a first common mode node and a second common mode node;
the first common mode node is coupled to the first photodetector pair; and the circuit is configured to detect movement along another axis away from the radiation source by analyzing a first common mode signal generated at the first common mode node.

7. The input device of claim 6, wherein the second common mode node is coupled to the second photodetector pair, and the circuit is configured to detect movement along the another axis toward the radiation source by analyzing a second common mode signal generated at the second common mode node.

8. The input device of claim 7, wherein the circuit is configured to detect a change in the first and second common mode signals when the external object compresses the reflector dome.

9. The input device of claim 1, wherein the first and second photodetector pairs have a peak spectral response at a wavelength between 450 nm-950 nm.

10. The input device of claim 1 further comprising a reflector dome positioned above the radiation source.

11. The input device of claim 10, wherein the circuit is configured to switch from an idle mode to an operation mode when the reflector dome is compressed, and the circuit is configured to start detecting movement of the external object in the operation mode.

12. The input device of claim 10, wherein the reflector dome is made from a resilient material at least partially coated with a metallic material.

13. A navigation input device, comprising:
a radiation source;
a first photodetector pair, the radiation source located in the middle of the first photodetector pair to form a first axis;
a first common mode node electrically coupled to the first photodetector pair;
a second photodetector pair the radiation source located in the middle of the second photodetector pair to form a second axis perpendicular to the first axis;
a second common mode node electrically coupled to the second photodetector pair; and
a circuit electrically coupled to the first and second common mode nodes, wherein the circuit comprises a digital signal processing circuit and is configured to measure an average value of a first common mode signal generated at the first common mode node and a second common mode signal generated at the second common mode node to produce an output signal, the output signal correlates to movement of an external object along another axis perpendicular to the first and second axes.

14. The navigation input device of claim 13, further comprising a capacitive sensor and a top plate, wherein:

the top plate is disposed above the first and second photodetector pairs;
the capacitive sensor is disposed at the top plate and the capacitive sensor is configured to produce an output when an external object touches the top plate.

15. The navigation input device of claim 13, further comprising a reflector dome positioned above the radiation source and the first and second photodetector pairs, wherein:
the circuit is configured to start detecting movement of the external object by switching from an idle mode to an operation mode; and
the circuit is configured to switch from the idle mode to the operation mode when the reflector dome is compressed to a default position by the external object.

16. The navigation input device of claim 15, wherein the reflector dome made from a resilient material at least partially coated with a metallic material.

17. The navigation input device of claim 15, wherein the output signal of the circuit is computed using the first and second common mode signals when the reflector dome is compressed by the external object.

18. An input device, comprising:
a radiation source;
a first photodetector pair located along a first axis with the radiation source located between the first photodetector pair, the first photodetector pair being configured to generate a first differential signal and a first common mode signal;
a second photodetector pair located along a second axis perpendicular to the first axis with the radiation source located between the second photodetector pair, the second photodetector pair being configured to generate a second differential signal and a second common mode signal; and
a circuit coupled to the first and second common mode signals,
wherein the circuit is configured to multiply the first and second common mode signals with a weighting factor to detect movement of an external object along another axis perpendicular to the first and second axes.

19. The input device of claim 18, wherein the circuit further comprising an analog to digital converter and a digital signal processing circuit to perform digital signal processing on the first and second common mode signals.

20. The input device of claim 18, wherein the circuit comprises a comparator circuit to compare the first and second common mode signals to detect movement of the external object along the another axis.

* * * * *